United States Patent
Wang et al.

(10) Patent No.: US 10,892,632 B2
(45) Date of Patent: Jan. 12, 2021

(54) CONFIGURABLE GRID CHARGING COIL WITH ACTIVE SWITCH AND SENSING SYSTEM

(71) Applicant: Toyota Motor Engineering & Manufacturing North America, Inc., Erlanger, KY (US)

(72) Inventors: Chi-Ming Wang, Ann Arbor, MI (US); Ercan M. Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 484 days.

(21) Appl. No.: 15/677,969

(22) Filed: Aug. 15, 2017

(65) Prior Publication Data
US 2019/0058348 A1 Feb. 21, 2019

(51) Int. Cl.
| | | |
|---|---|---|
| *H02J 7/00* | (2006.01) | |
| *H02J 7/02* | (2016.01) | |
| *B60L 53/12* | (2019.01) | |
| *H02J 50/90* | (2016.01) | |
| *H02J 50/10* | (2016.01) | |

(52) U.S. Cl.
CPC ............... *H02J 7/025* (2013.01); *B60L 53/12* (2019.02); *H02J 7/0027* (2013.01); *H02J 50/10* (2016.02); *H02J 50/90* (2016.02)

(58) Field of Classification Search
USPC ........................................................ 320/108
See application file for complete search history.

(56) References Cited

U.S. PATENT DOCUMENTS

| | | |
|---|---|---|
| 8,466,654 B2 | 6/2013 | Cook et al. |
| 9,135,803 B1 | 9/2015 | Fields et al. |
| 9,463,707 B2 | 10/2016 | Lewis |
| 9,466,419 B2 | 10/2016 | Boys et al. |
| 9,630,516 B2 | 4/2017 | Enomoto |
| 9,649,948 B2 | 5/2017 | Bell et al. |

(Continued)

FOREIGN PATENT DOCUMENTS

| | | |
|---|---|---|
| WO | WO2012136303 | 10/2012 |
| WO | WO2013127445 | 9/2013 |
| WO | WO2017050486 | 3/2017 |

OTHER PUBLICATIONS

Marco et al.; "Multimode Charging of Electric Vehicles"; PCIM Europe, May 2016; pp. 401-409 (9 pages).

(Continued)

*Primary Examiner* — Samuel Berhanu
(74) *Attorney, Agent, or Firm* — Snell & Wilmer LLP

(57) ABSTRACT

Methods, systems, and device for wirelessly charging a device. The inductive charging system includes a power source for providing an electrical charge that is wirelessly transferred or emitted to charge a first device. The inductive charging system includes a configurable grid that is configured to form a first inductive loop and multiple switches. Each switch is configured to open and close to electrically connect different portions of the configurable grid. The inductive charging system includes a processor connected to the multiple switches. The processor is configured to operate the multiple switches to open and close the portions of the configurable grid to form the first inductive loop that wirelessly transfers the electrical charge to the first device.

19 Claims, 8 Drawing Sheets

(56) References Cited

U.S. PATENT DOCUMENTS

| | | | |
|---|---|---|---|
| 2012/0025623 A1* | 2/2012 | Low | H02J 7/02 |
| | | | 307/104 |
| 2013/0119773 A1* | 5/2013 | Davis | H02J 50/90 |
| | | | 307/104 |
| 2013/0127254 A1* | 5/2013 | Miichi | H02J 50/90 |
| | | | 307/104 |
| 2013/0335015 A1* | 12/2013 | Ichikawa | H02J 7/025 |
| | | | 320/108 |
| 2014/0145514 A1 | 5/2014 | Konno et al. | |
| 2014/0361735 A1* | 12/2014 | Li | H02J 50/12 |
| | | | 320/108 |
| 2015/0115728 A1* | 4/2015 | Yamamoto | H01F 38/14 |
| | | | 307/104 |
| 2016/0020633 A1* | 1/2016 | Han | H02J 7/042 |
| | | | 320/108 |
| 2016/0318413 A1 | 11/2016 | Roehel et al. | |
| 2016/0325631 A1 | 11/2016 | Lannoije et al. | |
| 2017/0028854 A1 | 2/2017 | Lee et al. | |

OTHER PUBLICATIONS

Miller et al.; "*Demonstrating Dynamic Wireless Charging of an Electric Vehicle*"; IEEE Power Electronics Magazine, Mar. 2014; pp. 12-24 (13 pages).

\* cited by examiner

CONFIGURABLE GRID CHARGING COIL WITH ACTIVE SWITCH AND SENSING SYSTEM

BACKGROUND

1. Field

This specification relates to a system and a method for wirelessly charging a device.

2. Description of the Related Art

Battery of devices, such as smartphones, smartwatches and vehicles, may be charged via inductive charging. Vehicles, such as electric vehicles (EV) and plug-in hybrid vehicles (PHV) may charge their batteries via inductive charging. Inductive charging, also known as wireless charging, uses an electromagnetic field to transfer electrical energy between a source, such as a charging station, and a device, such as an EV or PHV vehicle, that stores and/or uses the electrical charge. An inductive coil creates an alternating electromagnetic field which is transmitted to a second inductive coil in another device that converts the power from the electromagnetic field into an electric current to charge a battery or run the device. For example, an inductive loop of a charging station wirelessly transfers power to a corresponding inductive coil of a device. The inductive coil of the charging station is often in a fixed position and the device is placed or positioned on or near the charging station. The corresponding inductive coil of the device, however, may be misaligned with the inductive coil of the charging station which results in a decrease in the efficiency of the transfer of the electrical energy. That is, when the corresponding coil is mis-aligned a greater amount of electrical energy is lost in the transfer of the electrical energy to the corresponding inductive coil.

Accordingly, there is a need for a system and method to improve the efficiency of wirelessly charging a device, such as a vehicle.

SUMMARY

In general, one aspect of the subject matter described in this specification is embodied in a inductive charging system. The inductive charging system includes a power source for providing an electrical charge that is wirelessly transferred or emitted to charge a first device. The inductive charging system includes a configurable grid that is configured to form a first inductive loop and multiple switches. Each switch is configured to open and close to electrically connect different portions of the configurable grid. The inductive charging system includes a processor connected to the multiple switches. The processor is configured to operate the multiple switches to open and close the portions of the configurable grid to form the first inductive loop that wirelessly transfers the electrical charge to the first device.

These and other embodiments may optionally include one or more of the following features. The inductive charging system may include a sensor for detecting a position of the first device within the configurable grid. The processor may be connected to the sensor and may be configured to obtain, from the sensor, the position of the first device. The processor may be configured to open a first switch of the multiple switches and close a second switch of the multiple switches to form a closed-circuit within the configurable grid to form the first inductive loop. The processor may be configured to open the first switch and close the second switch to form the inductive loop based on the position of the first device. The sensor may be a camera that captures image data. The processor may be configured to obtain the position of the first device based on the image data. The configurable grid may have multiple cells. The sensor may detect an amount of the electrical charge that is drawn by the first device in each cell. The processor may be configured to obtain the position of the device based on the amount of the electrical charge that is drawn by the first device in the cell.

The configurable grid may have multiple cells that are formed from electrically conductive wire. Each cell may be shaped in a polygon that may include at least one of a triangle, square, rectangle, hexagon, or octagon. The cell may be formed in the polygon shape by closing one or more switches to form a closed circuit of the electrically conductive wire.

The inductive charging system may include a memory for storing a configuration of the multiple switches. The configuration may indicate whether each switch is closed or open. The processor may be configured to operate the multiple switches based on the stored configuration. The first inductive loop may form a first closed circuit. The processor may be configured to operate the multiple switches to form a second inductive loop that wirelessly transfers the electrical charge to a second device. The second inductive loop may form a second closed-circuit that is different from the first closed-circuit that forms the first inductive loop.

The inductive charging system may include a sensor configured to detect the first device and a distance between the configurable grid and the first device. The processor may be configured to determine that the distance between the configurable grid and the first device is less than or equal to a charging distance. The processor may activate the power source to provide the electrical energy to the configurable grid when the first device is within the charging distance.

In another aspect, the subject matter is embodied in an inductive charging device that wirelessly transfers electrical energy to a vehicle. The inductive charging device includes a power source for providing an electrical charge that is wirelessly transferred or emitted to charge a first device. The inductive charging device includes a configurable grid formed from electrically conductive wire and multiple switches that are configured to open and close to electrically connect portions of the configurable grid to form an inductive loop.

In another aspect, the subject matter is embodied in a method for wirelessly powering or charging devices. The method includes forming, by a processor, a first closed-circuit inductive loop within a configurable grid having multiple switches to wirelessly transfer a first electrical charge to a first device. The method includes providing, using a power source, the first electrical charge through the first closed-circuit inductive loop to transmit the electrical charge to the first device.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for wirelessly charging a device, such as a vehicle. Particular embodiments of the subject matter described in this specification may be implemented to realize one or more of the following advantages.

An inductive charging system that wirelessly charges a device. The inductive charging system is configurable, such that the shape of the inductive loop may be altered and/or configured to the shape of the inductive coil of the device that receives the electrical charge. This allows the inductive charging system to more efficiently charge the device that receives the charge. By sending an electrical charge through a configurable grid that may be apportioned to form an inductive loop in the shape of the corresponding inductive coil of device that is receiving the charge, the inductive charging system minimizes the amount of electromagnetic energy that is lost when charging the device.

For example, an inductive coil of a device, such as a vehicle, may be misaligned with the inductive loop of a charging station, and thus, in a typical inductive charger, a portion of the inductive loop of the charging station may emit a charge that is not received and converted by the corresponding inductive coil into electrical energy. The inductive charging system, however, may configure the shape of the inductive loop to more efficiently match that of the shape of the corresponding inductive coil that receives the electrical charge to minimize the amount of electrical charge that flows through portions of the inductive loop that do not align with the corresponding inductive coil. This allows a charging station to more efficiently charge a device.

Other benefits and advantages include being able to reconfigure the inductive loop into different shapes and/or sizes to more efficiently provide an electromagnetic charge to a device. For example, the inductive loop may have cells shaped as a hexagon or an octagon to more efficiently cover a corner of a receiving device that receives electrical energy than a cell shaped as a square or a rectangle. This improves energy efficiency in the transfer of the electrical energy to a corresponding inductive coil.

Additionally, the inductive charging system 100 may be reconfigurable to adjust to different shapes and/or sizes of different inductive coils of one or more devices. For example, a first device may have a rectangular shaped inductive coil of a first size while a second device may have an oval shaped inductive coil of a second size.

Figure 1:
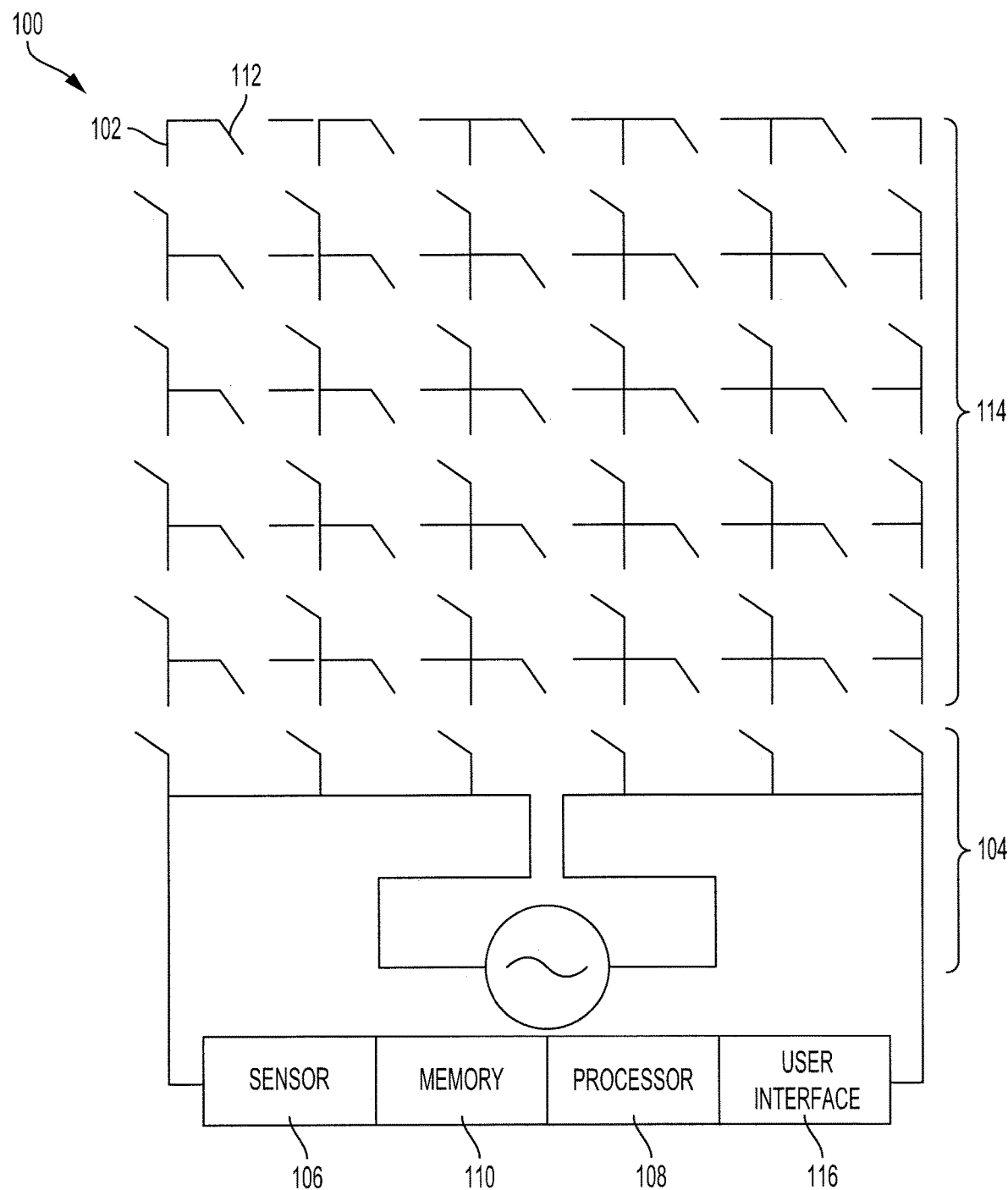
FIG. 1 is a block diagram of an example inductive charging system according to an aspect of the invention.

FIG. 1 is a block diagram of an example inductive charging system 100. The inductive charging system 100 includes a configurable electrical grid ("configurable grid") 102, a power source 104, multiple switches 112, a sensor 106 and a processor 108. The inductive charging system 100 may include a memory 110. The inductive charging system 100 includes a processor 108, appropriately programmed, to control the configurable grid 102 to form one or more inductive loops and control the electrical charge provided to the one or more inductive loops.

The inductive charging system 100 includes a configurable grid 102 that is made from multiple cells 114 of electrically conductive wire. The configurable grid 102 may be reconfigurable to any shape or size. The inductive charging system 100 closes and/or opens one or more switches of the multiple switches 112 to form one or more cells of the multiple cells 114. The one or more cells may interconnect to form the inductive loop. The multiple cells 114 may be arranged in an array or a matrix to form the configurable grid 102, as shown in FIG. 1, for example. The multiple cells 114 may be arranged in any number of shapes or sizes, such as an "L" shape, an "X" shape, a "T" shape, a square, a rectangle, a hexagon, an octagon, a triangle or other polygon. The multiple cells 114 may form a cascaded or lattice framework of any one of the number of shapes or sizes.

The individual cells of the multiple cells 114 may be shaped as a polygon, such as a square, a rectangle, a hexagon, an octagon, a triangle or other polygon, as shown in FIGS. 3A-3D, for example. The shape of the individual cell is formed by closing the multiple switches 112 on each edge of the individual cell that connects the electrically conductive wire.

The inductive charging system 100 has multiple switches 112 and each switch may be in an open position or a closed position. The individual cells may be cascaded, latticed or otherwise connected to form a set of cells that form the inductive loop within the configurable grid 102. Each switch may receive a signal from the one or more processors 108 to be set into the open position or the closed position. The switches that are in the closed position connect one or more cells of the multiple cells 114 to form one or more inductive loops that are each a closed circuit. The power source 104 may provide a charge through the one or more closed-circuit inductive loops to wirelessly charge an inductive coil of a receiving device.

Figure 4A:
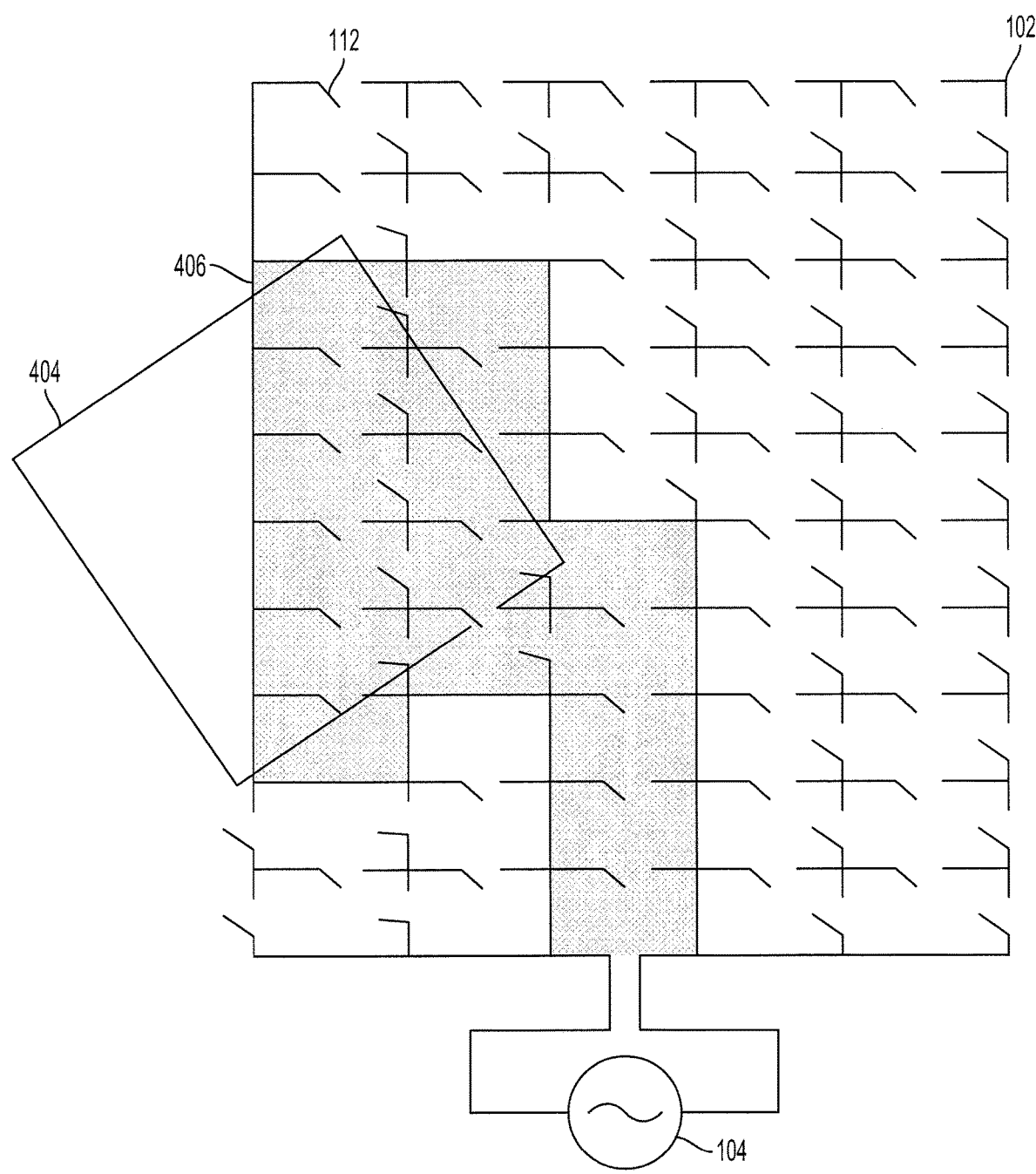
FIGS. 4A-4B show example configurations of the configurable grid of FIG. 1 with additional switches or cells and/or a different cell shape according to an aspect of the invention.

The efficiency of the configurable grid 102 may be based on the shape of an inductive coil of a receiving device, the number of switches within the configurable grid 102 and the shape of the individual cells. As the number of switches increases and/or the shape of the individual cells are more refined, the efficiency of the configurable grid 102 is increased because the inductive charging system 100 better approximates the shape of the inductive coil of a receiving device. For example, the configurable grid 102, shown in FIG. 4A, has more switches 112 and is more refined than the configurable grid 102, shown in FIG. 1. The additional switches 112 and more refined rectangular shape of the configurable grid 102, as shown in FIG. 4A, allows the inductive charging system 100 to form an inductive loop 406 (shaded area) that better approximates the inductive coil 404. Similarly, the efficiency of the configurable grid 102 decreases as the number of switches decreases and/or the individual cells become less refined.

Figure 4B:
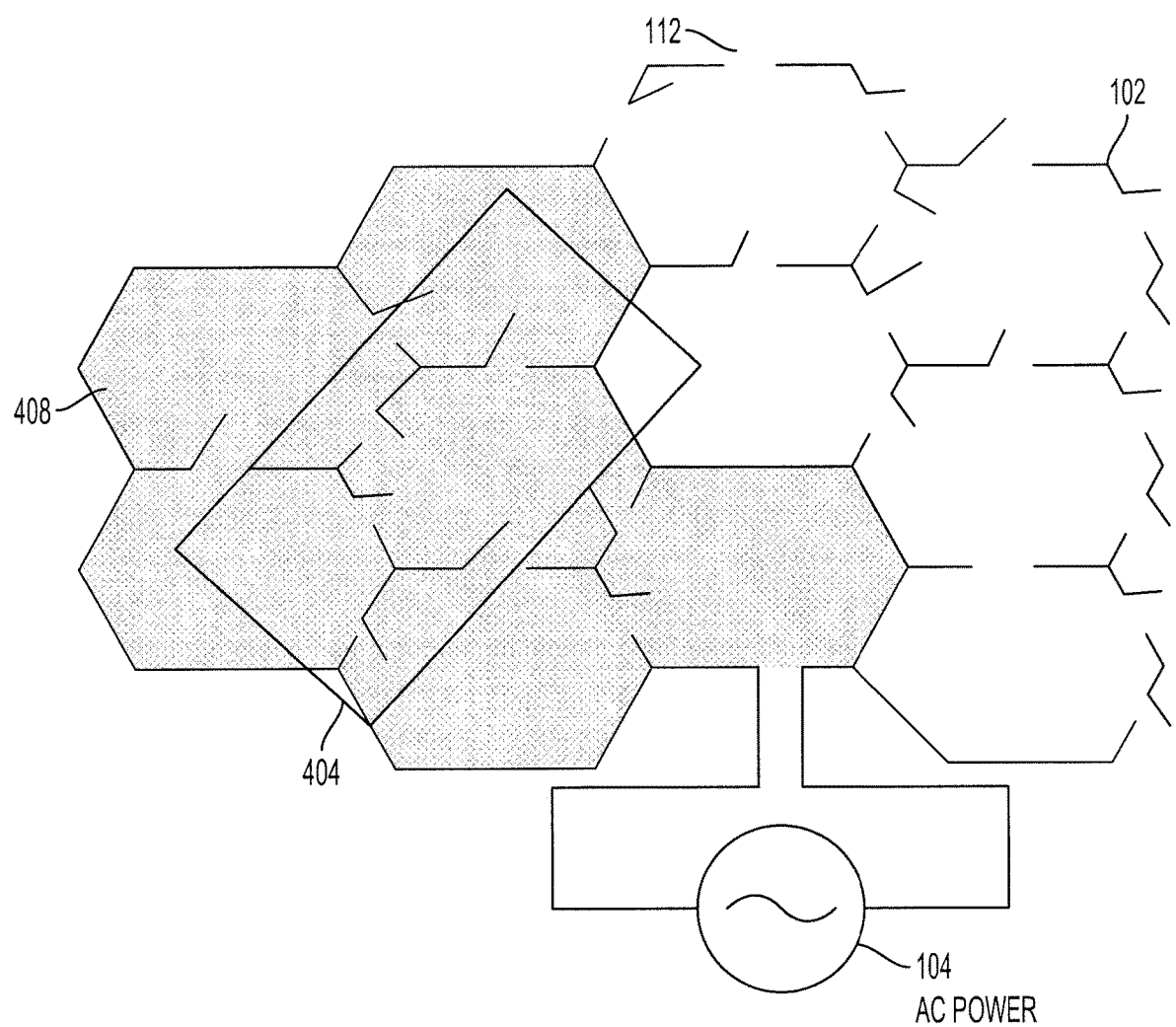

In another example, the configurable grid 102, as shown in FIG. 4B, is formed from individual cells that are shaped as a hexagon. Since the hexagon shape has more switches and more closely approximates the edges of the inductive coil 404, the inductive charging system 100 may form an inductive loop 408 that better approximates the shape of the inductive coil 404. The shape and positioning of the inductive coil 404 also effects the efficiency of the inductive charging system 100. The inductive charging system 100 is more efficient when the inductive coil 404 is aligned with the individual cells of the configurable grid 102 than when the inductive coil 404 is mis-aligned because the inductive charging system 100 more fully utilizes the inductive loop to charge the inductive coil 404.

The inductive charging system 100 includes a power source 104. The power source 104 may be a charging station that provides an alternating current (AC), a power supply in a building or a battery supply of another device, such as a vehicle.

The inductive charging system 100 includes one or more sensors 106. The one or more sensors 106 may be embedded within the configurable grid 102 and/or may be a physically separate device that is connected to the configurable grid 102, multiple switches 112 and/or the one or more processors 108. The one or more sensors 106 may include a camera, such as an optical camera or infrared camera, that captures image data to be later processed to determine a shape, a location, a position and/or an orientation of an inductive coil of a device that receives the electrical charge. The one or more sensors 106 may include a power sensor that measures an amount of electrical energy that is drawn or received by a device from a single cell.

The inductive charging system 100 may include a memory 110. The memory 110 may be coupled to the one or more processors 108, and may be one or more of a RAM or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the one or more processors 108. The memory 110 may store one or more configuration settings that indicate the position of the multiple switches 112 within the configurable grid 102 to form the one or more inductive loops.

The inductive charging system 100 may include a user interface 116. The user interface 116 may be an input/output device, such as a touch-screen display, that may have user interface elements to receive user input. The user input may set a first set of switches of the multiple switches 112 into the open position and a second set of switches of the multiple switches 112 into the closed position. Once set, the inductive charging system 100 may store the first set and second set of switches into one or more configuration settings. The user interface 116 may have a display that displays the configurable grid 102 and the positions of the multiple switches 112 to the user.

Figure 2:
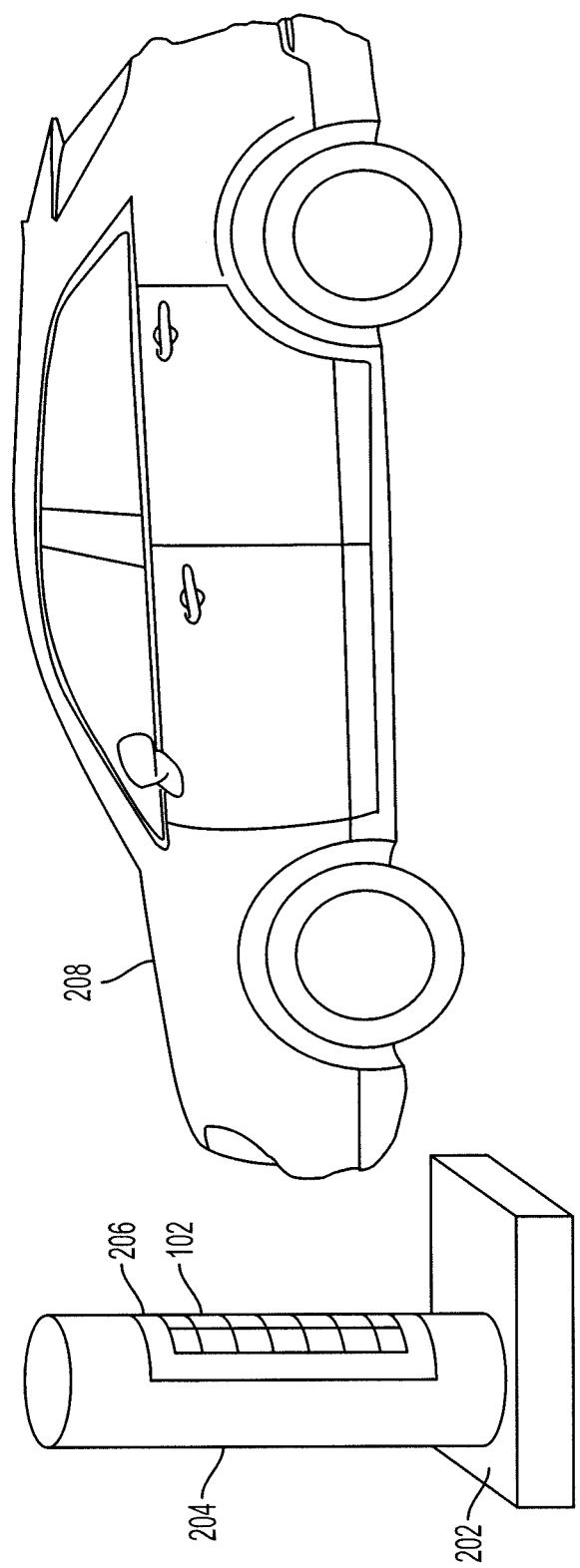
FIG. 2 shows the inductive charging system of FIG. 1 positioned on a non-planar surface according to an aspect of the invention.
Figure 3D:
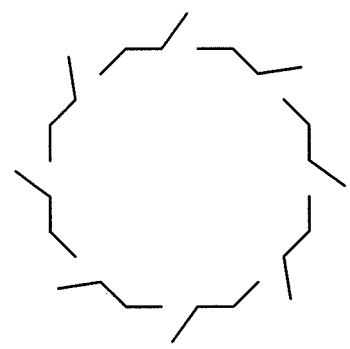
FIG. 3D shows an example octagonal configuration or shape for the cells of the configurable grid of FIG. 1 according to an aspect of the invention.
Figure 3C:
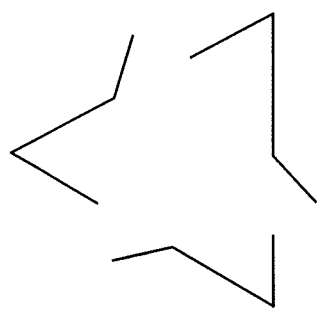
FIG. 3C shows an example triangular configuration or shape for the cells of the configurable grid of FIG. 1 according to an aspect of the invention.
Figure 3B:
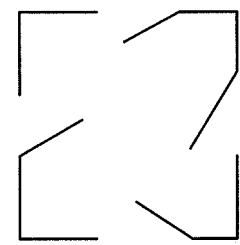
FIG. 3B shows an example rectangular configuration or shape for the cells of the configurable grid of FIG. 1 according to an aspect of the invention.
Figure 3A:
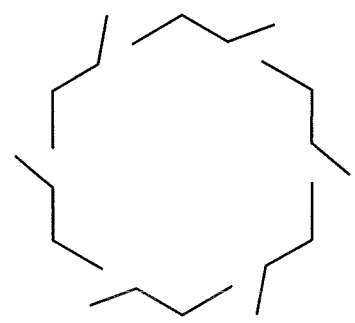
FIG. 3A shows an example hexagonal configuration or shape for the cells of the configurable grid of FIG. 1 according to an aspect of the invention.

The inductive charging system 100 may be configured to be positioned on a planar surface, such as a table or a mount on a charging station, or a non-planar surface, such as a pole on the charging station. FIG. 2 illustrates an example of the configurable grid 102 being on a non-planar surface, such as the pole 204 of the charging station 202. The inductive charging system 100 may include a flexible planar sheet 206. The configurable grid 102 may be positioned on or embedded within the flexible planar sheet 206, such that the flexible planar sheet 206 may wrap around the pole 204. The flexible planar sheet 206, the multiple cells 114 and the configurable grid 102 are configured to allow the inductive charging system 100 to wrap around the non-planar surface and provide the electrical charge to an inductive coil of the receiving device, such as a vehicle 208.

Figure 5:
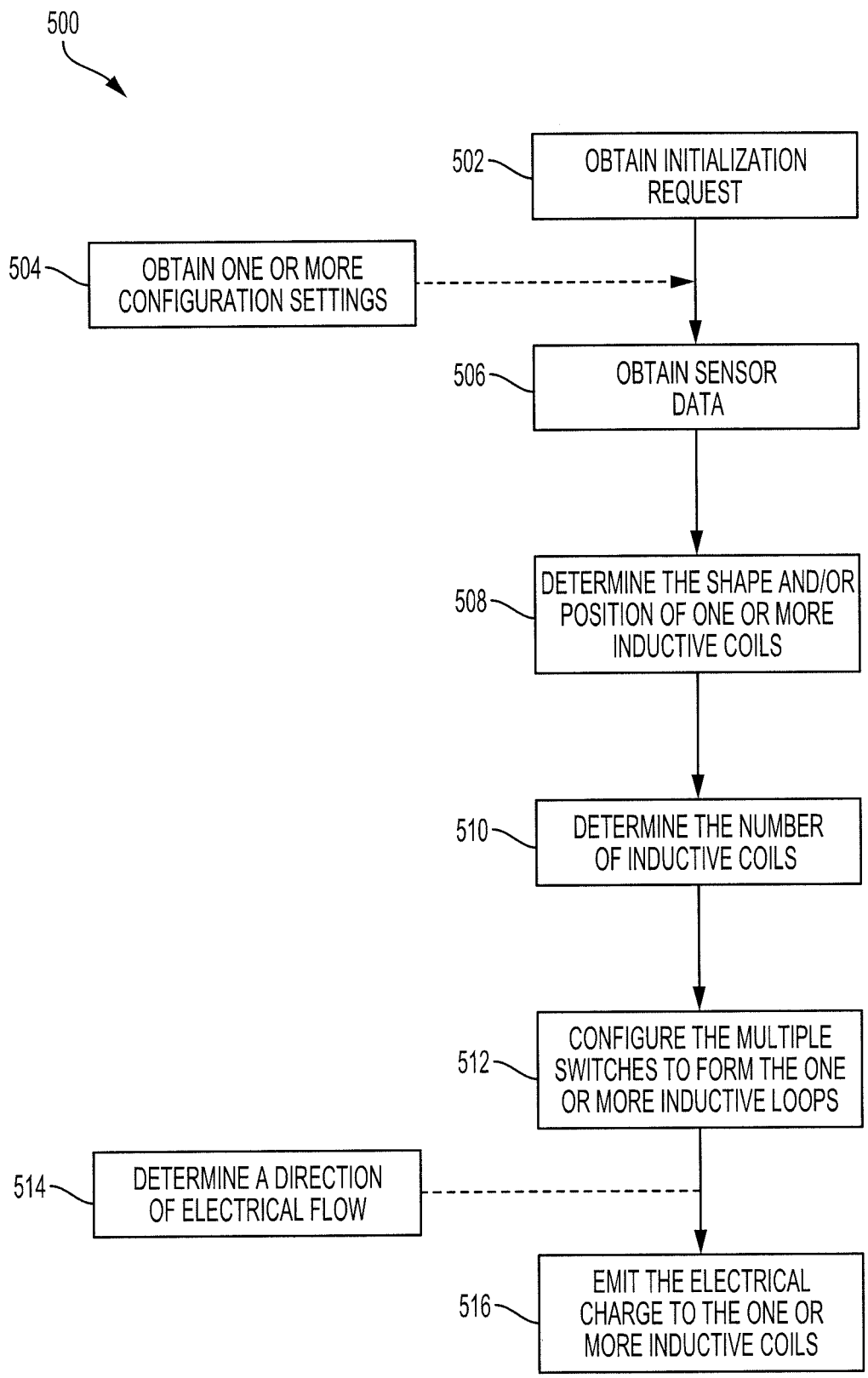
FIG. 5 is a flow diagram of an example process for providing an electrical charge to one or more inductive coils of a receiving device according to an aspect of the invention.

FIG. 5 is a flow diagram of an example process for wirelessly charging a device. One or more computers or one or more data processing apparatuses, for example, the one or more processors 108 of the inductive charging system 100 of FIG. 1, appropriately programmed, may implement the process 500.

The inductive charging system 100 may obtain an initialization request (502). The inductive charging system 100 may receive the initialization request when a user activates the inductive charging system 100, e.g., when a charging station is turned on. The inductive charging system 100 may receive the initialization request from one or more sensors 106, e.g., when a device that needs to be charged is within a threshold distance of the inductive charging system 100. For example, when an EV and/or PHV vehicle is within a threshold distance of the charging station, a sensor 106 may detect the EV and/or PHV vehicle and initialize the inductive charging system 100.

The inductive charging system 100 may obtain one or more configuration settings (504). The initialization request may include one or more configuration settings for the multiple switches 112. The one or more configuration settings may set one or more switches of the multiple switches 112 into an open or a closed position to form one or more inductive loops. The one or more switches that are set into the closed position form a closed circuit (or inductive loop), e.g., the inductive loop 620 (shaded area) shown in FIG. 6. The inductive loop provides the inductive charge to the inductive coil of the receiving device. In some embodiments, the inductive charging system 100 may have previously stored the one or more configuration settings in the memory 110. The inductive charging system 100 may obtain the previously-stored one or more configuration settings and may close a first set of switches and/or open a second set of switches to form a set of cells that form one or more closed-circuits that are inductive loops.

In some implementations, the inductive charging system 100 may receive the one or more configuration settings from user input via a user interface 116. A user may manually set the multiple switches 112 into the open position or the closed position. The inductive charging system 100 may store the positions of the multiple switches as a configuration setting.

In some implementations, the one or more configuration settings indicate a fixed size or shape that corresponds with the inductive coil of the receiving device, such as a subset of 3 individual cells arranged vertically, horizontally or diagonally. The fixed size or shape may be of any number of shapes or sizes, e.g., a 3 cell×2 cell rectangular matrix. The shapes or sizes may be a standardized shape or size that corresponds with the inductive coils of different receiving devices.

Figure 6:
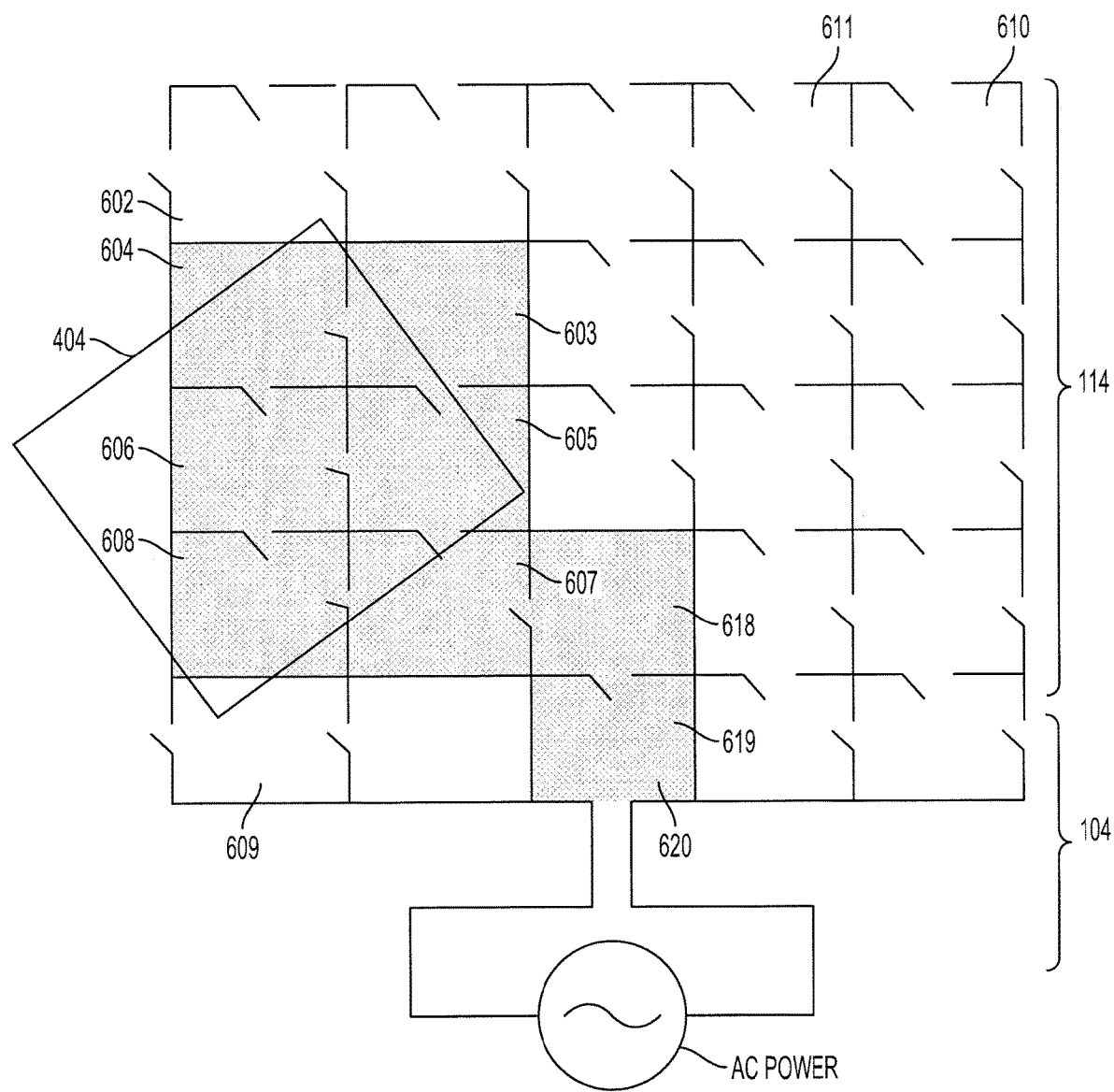
FIG. 6 shows an example configuration of the configurable grid of FIG. 1 to provide a charge to a mis-aligned inductive coil of a device according to an aspect of the invention.

The inductive charging system 100 may obtain sensor data from the one or more sensors 106 (506). The sensor data may include image data, such as an optical image or an infrared image from an optical camera or infrared camera, respectively. The sensor data may include energy efficiency information for each cell of the multiple cells. The energy efficiency information may include an amount or percentage of energy emitted by the cell that is drawn or received by the inductive coil 404 of the receiving device. For example, in cell 602, the energy efficiency information for cell 602 may indicate that only 10% of the energy emitted by the cell 602 would be received by the inductive coil 404 of the receiving device when the switches that form cell 602 are closed to form a closed-circuit inductive loop, as shown in FIG. 6. The sensor data may include alignment information. The alignment information includes the relative position of an optical target from an optical sensor.

The inductive charging system 100 determines the shape and/or position of the one or more inductive coils of one or more receiving devices based on the sensor data (508). The inductive charging system 100 may determine the shape and/or position of an inductive coil by analyzing image data included in the sensor data. For example, the inductive charging system 100 may recognize edges, corners, contours or an outline of an inductive coil of the receiving device in an optical image of the inductive coil. The inductive charging system 100 may determine the shape and/or position of the inductive coil of the receiving device based on the edges, corners, contours or the outline of the inductive coil of the receiving device in the optical image.

In another example, the inductive charging system 100 may recognize thermal patterns of the inductive coil of the receiving device from an infrared image of the inductive coil. The inductive charging system 100 may determine the shape and/or position of the inductive coil of the receiving device based on the thermal patterns of the inductive coil of the receiving device. Since areas that receive the electrical charge have a higher temperature than areas that do not receive the electrical charge, the inductive charging system 100 may differentiate the shape and/or position of the inductive coils that are receiving the electrical charge from the thermal patterns of the infrared image. In another example, the inductive charging system 100 determines the position and/or shape of the inductive coil of the receiving device using the relative position of the optical targets from the optical sensor.

In some implementations, the inductive charging system 100 may use a sensor device that measures the amount or percentage of power drawn or received by the inductive coil of the receiving device from a cell to determine the shape and/or position of the inductive coil of the receiving device. If the amount or percentage of power drawn or received is greater than or equal to a threshold value, the inductive charging system 100 may determine that the inductive coil is positioned on the cell of the configurable grid 102. The threshold value may be an amount or percentage of power that is lost by the inductive coil.

The inductive charging system 100 may determine the number of inductive coils that are positioned near the configurable grid 102 to receive the electrical charge based on the shape and/or position of the one or more inductive coils of the receiving device (510). The inductive charging system 100 may analyze the number of closed shapes and/or the number of distinct positions of the one or more inductive coils of the receiving device to determine the number of inductive coils. For example, if the inductive charging system 100 determines that there are two closed outlines that form two distinct polygons from the image data, the inductive charging system 100 may determine that the two closed outlines represent two inductive coils that are to receive the electrical charge.

The inductive charging system 100 configures the multiple switches 112 to form the one or more inductive loops using the one or more configuration settings, the shape and/or position of the one or more inductive loops, or a combination of both (512). The inductive charging system 100 positions a first set of switches of the multiple switches 112 into an open position and/or a second set of switches of the multiple switches into a closed position to form one or more inductive loops. The second set of switches that are in the closed position connect one or more individual cells of the multiple cells 114 in the configurable grid 102 to form the one or more inductive loops.

The inductive charging system 100 may receive an indication, such as from user input, which indicates to the inductive charging system 100 to use one or more configuration settings or the shape and/or position of the one or more inductive coils determined from the sensor data to configure the multiple switches 112. In some implementations, the inductive charging system 100 defaults to using the one or more configuration settings or the shape and/or position of the one or more inductive coils determined from the sensor data.

If the one or more configuration settings provide the position for each switch, the inductive charging system 100 opens or closes each switch within the configurable grid 102 based on the one or more configuration settings. If the one or more configuration settings provide the fixed size or shape of the inductive coil of the receiving device, the inductive charging system 100 may sequentially or randomly form inductive loops from a subset of individual cells having the fixed size or shape of the inductive coil within the configurable grid 102. The inductive charging system 100 may determine the optimal subset of individual cells based on measuring the power drawn or received by the inductive coil of the receiving device. That is, the inductive charging system 100 may scan subsets of individual cells within the configurable grid 102 to determine the optimal subset that most efficiently transfers the electrical charge.

The inductive charging system 100 may configure the multiple switches to form the one or more inductive loops based on the sensor data including the shape and/or the position of the one or more inductive coils. The inductive charging system 100 may set a first set of switches to the closed position and a second set of switches to the open position to match the shape and/or position of the closed-circuit inductive loop with the inductive coil of the receiving device. The inductive charging system 100 may perform the matching using the image data, alignment information, thermal patterns, and/or the measured amount or percentage of power drawn or received by the inductive coil. FIG. 6 illustrates a mis-aligned inductive coil 404 of a device to be charged where the inductive charging system 100 configures the switches to optimally charge the inductive coil 404.

The inductive coil 404 of the device is mis-aligned with the cells of the configurable grid 102. The inductive coil 404, for example, does not receive an electrical charge from the cells 610, 611 of the multiple cells 114 and may receive a partial electrical charge from the cells 602-605, 607-609. The inductive charging system 100 may determine that the electrical charge emitted by the cells 610, 611 would be lost or not received by the inductive coil 404 based on the shape and/or position of the inductive coil 404. Thus, the inductive charging system 100 may not close the switches that form the cells 610, 611. By positioning the switches that form the cells 610, 611 in the open position, the size of the inductive loop is minimized and the inductive charging system 100 provides electrical energy through the other cells that form the inductive loop 620 (shaded area).

The inductive charging system 100 may determine that the electrical charge that is emitted by cells 602-609 may be received by the inductive coil 404. The inductive charging system 100 may determine an amount or percentage of the electrical charge that is received by the inductive coil 404 in each of the cells 602-609. If the amount or percentage of the electrical charge that is received by the inductive coil for the cell is greater than or equal to a threshold amount, such as an amount or percentage of energy lost due to dissipation, the inductive charging system 100 may connect the switches that form the cell. Otherwise, if the amount or percentage of the electrical charge that is received by the inductive coil for the cell is less than or equal to the threshold amount, the inductive charging system 100 may disconnect the switches that form the cell. For example, the switches for the cells 603-608 may be set into the closed position because the inductive coil 404 is positioned such that the inductive coil 404 receives more electrical energy in the cells than the threshold amount. Additional cells 618-619 may be closed to form a closed-circuit to create the inductive loop 620 (shaded area). The cells 602 and 609 may be set into the open position because the inductive coil 404 receives an amount or percentage of electrical energy in the cells that is less than the threshold amount.

Figure 7:
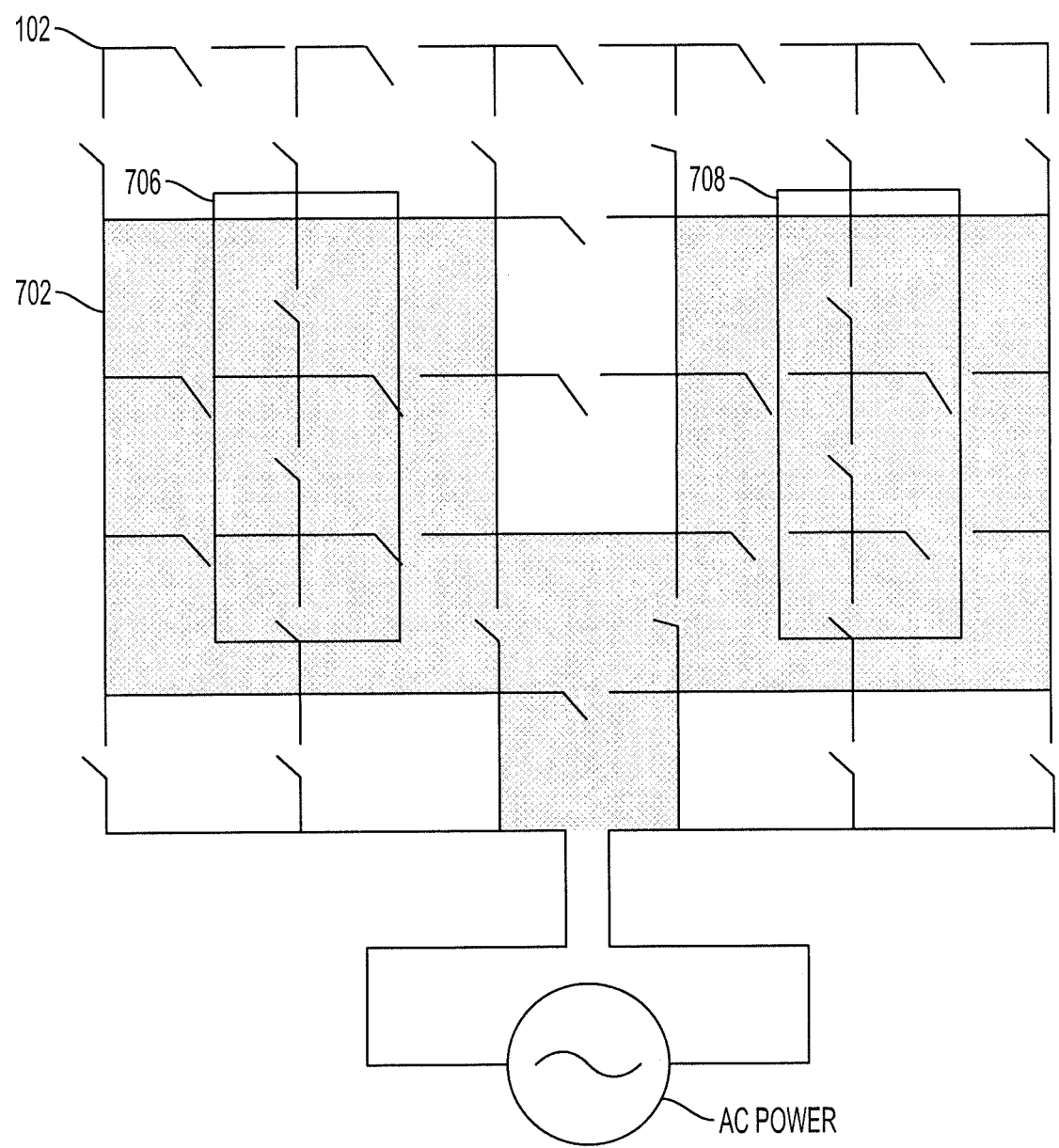
FIG. 7 shows an example configuration of the configurable grid of FIG. 1 to provide a charge to two inductive coils of one or more receiving devices according to an aspect of the invention.

The inductive charging system 100 may configure the multiple switches 112 further based on the number of inductive coils. If there are multiple inductive coils, the inductive charging system 100 may form multiple inductive loops or a single larger inductive loop 702 (shaded area) within the configurable grid 102 that charges the multiple inductive coils. For example, as shown in FIG. 7, two inductive coils 706, 708 that belong to two receiving devices may be positioned over the configurable grid 102 to be charged. The inductive charging system 100 determines the shape and/or position of the inductive coils 706, 708, and in response, forms a larger inductive loop 702 (shaded area) to provide an electrical charge to the inductive coils 706, 708, respectively.

The inductive charging system 100 may configure the multiple switches 112 based on a combination of the one or more configuration settings and the shape and/or the position of the one of more inductive coils. If there is more than one inductive coil, the inductive charging system 100 may configure the position of a first set of switches based on one or more configuration settings and configure the position of a second set of switches based on the shape and/or the position of the one or more inductive coils. That is, the inductive charging system 100 may configure each of the one or more inductive loops that are formed independently of another inductive loop. By closing multiple switches 112 to form the one or more inductive loops, the inductive charging system 100 does not create an overlapping electromagnetic force within each of the one or more inductive loops. The switches 112 may be modified in real-time allowing the inductive charging system 100 to more efficiently charge devices having varying and different inductive coil shapes and/or sizes.

The inductive charging system 100 may determine a direction of electrical flow for each of the one or more inductive loops that are formed (514). The direction of the electrical flow for an inductive loop of the one or more inductive loops may be based on user input, one or more configuration settings, or communication with the device receiving the electrical charge from the inductive loop.

Once the multiple switches 112 are positioned to form one or more closed-circuit inductive loops, the inductive charging system 100 provides the electrical charge to the one or more closed-circuit inductive loops to emit and wirelessly charge the one or more inductive coils of the one or more devices that are being charged. The inductive charging system 100 emits the electrical charge to charge the one or more inductive coils of the receiving device (516).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An inductive charging system, comprising:
   a power source for providing an electrical charge that is wirelessly transferred or emitted to charge a first device;
   a configurable grid that is configured to form and change a shape or a size of a single closed-circuit inductive loop that wirelessly transfers the electrical charge to the first device based on a shape or a size of an inductive coil of the first device;
   a plurality of switches within the configurable grid, each switch of the plurality of switches being configured to open and close to electrically connect different portions of the configurable grid to form and change the shape or the size of the single closed-circuit inductive loop;
   a memory for storing a configuration of the plurality of switches that indicates whether each switch of the plurality of switches is closed or open; and
   a processor connected to the plurality of switches and configured to operate the plurality of switches to open and close to electrically connect the different portions of the configurable grid to form the shape or the size of the single closed-circuit inductive loop based on the stored configuration.

2. The inductive charging system of claim 1, wherein to operate the plurality of switches the processor is configured to open a first switch of the plurality of switches and close a second switch of the plurality of switches to form the shape or the size of the single closed-circuit inductive loop.

3. The inductive charging system of claim 2, further comprising:
   a sensor for detecting a position, of the first device within the configurable grid;
   wherein the processor is connected to the sensor and configured to:
   obtain, from the sensor, the position of the first device, and
   open the first switch and close the second switch to form the single closed-circuit inductive loop based on the position of the first device.

4. The inductive charging system of claim 3, wherein the sensor is a camera that captures image data, wherein the processor is configured to obtain, from the sensor, the position of the first device based on the image data.

5. The inductive charging system of claim 3, wherein the configurable grid has a plurality of cells, wherein the sensor detects an amount of the electrical charge that is drawn by the first device in each cell of the plurality of cells, wherein the processor is configured to obtain, from the sensor, the position of the first device based on the amount of the electrical charge that is drawn by the first device in each cell.

6. The inductive charging system of claim 1, wherein the configurable grid has a plurality of cells formed from electrically conductive wire, wherein each cell of the plurality of cells is shaped in a polygon including at least one of a triangle, square, rectangle, hexagon, or octagon.

7. The inductive charging system of claim 1, wherein the processor is further configured to operate the plurality of switches to open and close a second closed-circuit inductive loop that wirelessly transfers the electrical charge to a second device.

8. The inductive charging system of claim 1, further comprising:
   a sensor configured to detect the first device and a distance between the configurable grid and the first device:
   wherein the processor is configured to:
      determine that the distance between the configurable grid and the first device is less than or equal to a charging distance, and
      activate the power source to provide the electrical energy to the configurable grid when the first device is within the charging distance.

9. An inductive charging device that wirelessly transfers electrical energy to a vehicle, comprising:
   a power source for providing an electrical charge that is wirelessly transferred or emitted to charge a first device;
   a configurable grid formed from electrically conductive wire;
   a plurality of switches within the configurable grid that are configured to open and close to electrically connect portions of the configurable grid to form an inductive loop;
   a memory that is configured to store a configuration that indicates whether each switch of the plurality of switches is closed or open; and
   a processor coupled to the memory and configured to operate the plurality of switches to electrically connect portions of the configurable grid to form the inductive loop based on the stored configuration.

10. The inductive charging device of claim 9, wherein the configurable grid has a plurality of cells formed from the electrically conductive wire, wherein each cell of the plurality of cells is shaped in a polygon including at least one of a triangle, square, rectangle, hexagon, or octagon.

11. The inductive charging device of claim 10, wherein a cell of the plurality of cells is formed in the polygon shape by closing one or more switches of the plurality of switches to form a closed circuit of the electrically wire.

12. The inductive charging device, of claim 9, wherein the power source is connected to and provides the electrical charge through the portions of the configurable grid that form the inductive loop when one or more switches of the plurality of switches are positioned in a closed position.

13. A method for wirelessly powering or charging devices using a configurable grid having a plurality of switches and a plurality of cells, comprising:
   obtaining, by a processor and from a memory, a configuration setting that indicates whether each switch of the plurality of switches is closed or open;
   forming, by the processor, a first closed-circuit of a first inductive loop having a shape and a size within the configurable grid based on the configuration setting;
   detecting, using a sensor, an amount of a first electrical charge that is drawn by a first device in each cell of the plurality of cells;
   determining, by the processor, a position of the first device based on the amount of the first electrical charge that is drawn by the first device in each cell;
   changing, by the processor, the shape or the size of the first closed-circuit of the first inductive loop based on the position of the first device; and
   providing, using a power source, the first electrical charge through the first closed-circuit of the first inductive loop to transmit the first electrical charge to the first device.

14. The method of claim 13, wherein changing the shape or the size of the first closed-circuit includes configuring one or more, switches of the plurality, of switches into at least one of an open position or a closed position to form the first closed-circuit of the first inductive loop.

15. The method of claim 13, further comprising:
   obtaining, from a sensor, sensor data that indicates a shape of an inductive coil of the first device; and
   determining the shape of the inductive coil of the first device based on the sensor data.

16. The method of claim 15, wherein obtaining the sensor data includes capturing an image of the inductive coil of the first device, wherein determining the shape of the inductive coil includes analyzing the image and determining an outline of the inductive coil.

17. The method of claim 13, further comprising:
   forming, by the processor, a second closed-circuit of a second inductive loop within the configurable grid to wirelessly transfer a second electrical charge to a second device; and
   providing, using the power source, the second electrical charge through the second closed-circuit to transmit the second electrical charge to the second device.

18. The method of claim 17, wherein providing the first electrical charge through the first closed-circuit occurs simultaneously with providing the second electrical charge through the second closed-circuit.

19. The method of claim 18, wherein the first electrical charge and the second electrical are of a different polarity or flow in a different direction.

* * * * *